(12) United States Patent
Muntean et al.

(10) Patent No.: US 12,711,627 B2
(45) Date of Patent: Aug. 18, 2026

(54) METHOD FOR A THREE-DIMENSIONAL ROAD AREA SEGMENTATION FOR A VEHICLE

(71) Applicant: Robert Bosch GmbH, Stuttgart (DE)

(72) Inventors: Andrei-Ovidiu Muntean, Cluj-Napoca (RO); Istvan Nagy, Cluj-Napoca (RO)

(73) Assignee: ROBERT BOSCH GMBH, Stuttgart (DE)

( * ) Notice: Subject to any disclaimer, the term of this patent is extended or adjusted under 35 U.S.C. 154(b) by 299 days.

(21) Appl. No.: 18/426,537

(22) Filed: Jan. 30, 2024

(65) Prior Publication Data

US 2024/0312021 A1 Sep. 19, 2024

(30) Foreign Application Priority Data

Mar. 13, 2023 (DE) .................... 10 2023 202 244.3

(51) Int. Cl.
*G06T 7/11* (2017.01)
*B60W 60/00* (2020.01)
(Continued)

(52) U.S. Cl.
CPC ............ *G06T 7/11* (2017.01); *B60W 60/001* (2020.02); *G06T 7/50* (2017.01); *G06V 10/764* (2022.01);
(Continued)

(58) Field of Classification Search
CPC ... G06T 7/11; G06T 7/50; G06T 2207/30256; G06T 7/136; G06T 2207/10016;
(Continued)

(56) References Cited

U.S. PATENT DOCUMENTS 6,384,826 B1 * 5/2002 Bern ...................... G06T 17/20 345/581
10,466,715 B2 * 11/2019 You .......................... G06T 7/70
(Continued)

FOREIGN PATENT DOCUMENTS

WO 2021007561 A1 1/2021

OTHER PUBLICATIONS

Liu, Yang, et al. "Grid mapping for spatial pattern analyses of recurrent urban traffic congestion based on taxi GPS sensing data." Â SustainabilityÂ 9.4 (2017): 533. (Year: 2017).*
(Continued)

*Primary Examiner* — Amandeep Saini
*Assistant Examiner* — Andrew S Budisalich
(74) *Attorney, Agent, or Firm* — NORTON ROSE FULBRIGHT US LLP

(57) ABSTRACT

A method for a three-dimensional road area segmentation for a vehicle. The method includes: obtaining input data including multiple elements representing a scene of an environment of the vehicle, the input data indicating heights of the scene and resulting at least partially from a sensor detection of the environment; carrying out the three-dimensional road area segmentation based on the input data. The three-dimensional road area segmentation includes: classifying the elements based on the heights into at least a road class and an elevated surface class, thereby providing a classification result for each of the elements; determining a density level for multiple of the elements based on the classification results, the density levels being based on the density of the different classes; identifying at least a road surface and an elevated surface in the scene by forming the surfaces based on the density levels.

9 Claims, 6 Drawing Sheets

(51) Int. Cl.

| | |
|---|---|
| ***G06T 7/136*** | (2017.01) |
| ***G06T 7/50*** | (2017.01) |
| ***G06V 10/764*** | (2022.01) |
| ***G06V 20/56*** | (2022.01) |

(52) U.S. Cl.

CPC ....... *G06V 20/588* (2022.01); *B60W 2552/05* (2020.02); *G06T 2207/30256* (2013.01)

(58) Field of Classification Search

CPC ............ B60W 60/001; B60W 2552/05; G06V 10/764; G06V 20/588

See application file for complete search history.

(56) References Cited

U.S. PATENT DOCUMENTS

| | | | | |
|---|---|---|---|---|
| 2016/0069856 | A1* | 3/2016 | Gorritxategi | G01N 15/0227 356/70 |
| 2016/0140414 | A1* | 5/2016 | Pham | G06F 18/231 382/165 |
| 2017/0223235 | A1* | 8/2017 | Kang | H04N 7/01 |
| 2019/0379847 | A1* | 12/2019 | Ferrari | G06T 7/90 |
| 2020/0324786 | A1* | 10/2020 | Gray | B60W 60/0059 |
| 2020/0327313 | A1* | 10/2020 | Kedarisetti | G06V 20/52 |
| 2023/0267615 | A1* | 8/2023 | Agia | G01S 17/42 345/419 |
| 2024/0387050 | A1* | 11/2024 | Zhang | G16H 15/00 |
| 2025/0231299 | A1* | 7/2025 | Spangenberg | G01N 33/0098 |

OTHER PUBLICATIONS

Oniga et al., "Processing Dense Stereo Data Using Elevation Maps: Road Surface, Traffic Isle, and Obstacle Detection," IEEE Transactions on Vehicular Technology, vol. 59, No. 3, 2010, pp. 1172-1182. <https://sci-hub.ru/10.1109/tvt.2009.2039718> Downloaded Jan. 26, 2024.

Cheng et al., "Curb Detection for Road and Sidewalk Detection," IEEE Transactions on Vehicular Technology, vol. 67, No. 11, 2018, pp. 1-13. <https://sci-hub.ru/10.1109/tvt.2018.2865836> Downloaded Jan. 26, 2024.

Badrinarayanan et al., "SEGNET: a Deep Convolutional Encoder-Decoder Architecture for Image Segmentation," IEEE Transactions on Pattern Analysis and Machine Intelligence, vol. 39, No. 12, 2017, pp. 1-14. <https://sci-hub.ru/10.1109/tpami.2016.2644615> Downloaded Jan. 26, 2024.

Shetty et al., "Not Using the Car to See the Sidewalk-Quantifying and Controlling the Effects of Context in Classification and Segmentation," 2019 IEEE/CVF Conference on Computer Vision and Pattern Recognition (CVPR), 2019, pp. 8210-8218. <https://sci-hub.ru/10.1109/cvpr.2019.00841> Downloaded Jan. 26, 2024.

Zhang et al., "Semantic Segmentation of Urban Scenes Using Dense Depth Maps," European Conference on Computer Vision, ECCV, Springer, 2010, pp. 708-721. <https://sci-hub.ru/10.1007/978-3-642-15561-1_51> Downloaded Jan. 26, 2024.

Zhang et al., "Sensor Fusion for Semantic Segmentation of Urban Scenes," 2015 IEEE International Conference on Robotics and Automation (ICRA), IEEE, 2015, pp. 1850-1857. <https://sci-hub.ru/10.1109/icra.2015.7139439> Downloaded Jan. 26, 2024.

Hazirbas et al., "FUSENET: Incorporating Depth Into Semantic Segmentation via Fusion-Based CNN Architecture," Asian Conference on Computer Vision, ACCV, Springer, Part I, LNCS 10111, 2017, pp. 213-228. <https://sci-hub.ru/10.1007/978-3-319-54181-5_14> Downloaded Jan. 26, 2024.

Schubert et al., "DBSCAN Revisited, Revisited: Why and How You Should (Still) Use DBSCAN," ACM Transactions on Database Systems (TODS), vol. 42, No. 3, Article No. 19, 2017, pp. 1-21. <https://www.khoury.northeastern.edu/home/vip/teach/DMcourse/2_cluster_EM_mixt/notes_slides/revisitofrevisitDBSCAN.pdf> Downloaded Jan. 26, 2024.

Ester et al., "A Density-Based Algorithm for Discovering Clusters in Large Spatial Databases With Noise," Proceedings of 2nd International Conference on Knowledge Discovery and Data Mining (KDD-96), 1996, pp. 1-6.

Laghmara et al., "2.5D Evidential Grids for Dynamic Object Detection," 2019 22th International Conference on Information Fusion (Fusion), 2019, pp. 1-7.

Maye et al., "Curb Detection for a Pedestrian Robot in Urban Environments," 2012 IEEE International Conference on Robotics and Automation, 2012, pp. 1-8.

* cited by examiner 214
planar surface estimation
230
3D road area segmentation
210
211
212
213
220
60
221
225
226
225
222
height (meters)
y (meters)
1
0
8
6
4
2
0
-2
-4
-6
-8

METHOD FOR A THREE-DIMENSIONAL ROAD AREA SEGMENTATION FOR A VEHICLE

CROSS REFERENCE

The present application claims the benefit under 35 U.S.C. § 119 of German Patent Application No. DE 10 2023 202 244.3 filed on Mar. 13, 2023, which is expressly incorporated herein by reference in its entirety.

FIELD

The present invention relates to a method for a three-dimensional road area segmentation for a vehicle. Furthermore, the present invention relates to a computer program as well as a data processing apparatus.

BACKGROUND INFORMATION

Conventional methods for instance segmentation for elevated surfaces such as sidewalks, traffic isles, and roundabouts are for example described in Florin Oniga and Sergiu Nedevschi, "Processing dense stereo data using elevation maps: Road surface, traffic isle, and obstacle detection," IEEE Transactions on Vehicular Technology, 59(3): 1172-1182, 2009, which are based on Digital Elevantion Maps (DEM) for classifying points into road/elevated, and Mingmei Cheng, Yigong Zhang, Yingna Su, Jose M Alvarez, and Hui Kong; "Curb detection for road and sidewalk detection;" IEEE Transactions on Vehicular Technology, 67 (11): 10330-10342, 2018, which may, however, be less suitable for some types of elevated surfaces such as roundabouts and traffic isles.

Some other methods like the methods described in Vijay Badrinarayanan, Alex Kendall, and Roberto Cipolla; "Segnet: A deep convolutional encoder-decoder architecture for image segmentation;" IEEE transactions on pattern analysis and machine intelligence, 39(12): 2481-2495, 2017 use sidewalk semantic segmentation but tend to over rely on the context for the detection (see, e.g., Rakshith Shetty, Bernt Schiele, and Mario Fritz; "Not using the car to see the sidewalk-quantifying and controlling the effects of context in classification and segmentation," in Proceedings of the IEEE/CVF Conference on Computer Vision and Pattern Recognition, pages 8218-8226, 2019).

Another conventional principle is the use of conditional random fiels (short CRFs, see, e.g., Chenxi Zhang, Liang Wang, and Ruigang Yang; "Semantic segmentation of urban scenes using dense depth maps;" in European Conference on Computer Vision, pages 708-721. Springer, 2010 and Richard Zhang, Stefan A Candra, Kai Vetter, and Avideh Zakhor; "Sensor fusion for semantic segmentation of urban scenes;" in 2015 IEEE international conference on robotics and automation (ICRA), pages 1850-1857. IEEE, 2015). CRFs may enhance the classification with additional cues such as depth.

Also, techniques such as FuseNet (Caner Hazirbas, Lingni Ma, Csaba Domokos, and Daniel Cremers; "Fusenet: Incorporating depth into semantic segmentation via fusion-based cnn architecture;" in Asian conference on computer vision, pages 213-228. Springer, 2016) are available which incorporate depth information into the network.

SUMMARY

According to aspects of the present invention, a method, a computer program, and a data processing apparatus are provided. Features and details of the present invention are disclosed herein. Features and details described in the context of the method also correspond to the computer program as well as the data processing apparatus, and vice versa in each case.

According to an aspect of the present invention, a method for a three-dimensional road area segmentation for a vehicle may comprise obtaining input data. According to an example embodiment of the present invention, the input data may comprise multiple elements that represent a scene of an environment of the vehicle. The elements may be pixels or cells, particularly of an image that represents the full scene. The input data may further indicate heights of the scene. To this end, the input data may comprise data with height values, preferably resulting from a measurement and/or determined on basis of at least a depth map. The input data may result at least partially from a sensor detection of the environment. The heights may particularly be calculated using a depth information obtained from this sensor detection and/or by evaluating a distance between the sensor and objects and/or surfaces in the scene, for example obtained using a stereo camera.

Furthermore, according to an example embodiment of the present invention, the method may comprise carrying out the three-dimensional road area segmentation based on the input data. To this end, the three-dimensional road area segmentation may comprise:

- Classifying the elements based on the heights into at least a road class and an elevated surface class, thereby providing a classification result for each of the elements, wherein preferably the road class indicates the road in the scene and the elevated surface class indicates a surface in the scene that is elevated compared to the road,
- Determining a density level for multiple of the elements based on the classification results, the density levels preferably being based on the density of the different classes,
- Identifying at least a road surface and an elevated surface in the scene by forming the surfaces based on the density levels.

The present invention may thereby allow for an improved 3D instance segmentation for the road and elevated surfaces. Preferably, DBSCAN (see, Erich Schubert, Jorg Sander, Martin Ester, Hans Peter Kriegel, and Xiaowei Xu; "Dbscan revisited, revisited: why and how you should (still) use dbscan;" ACM Transactions on Database Systems (TODS), 42(3):1-21, 2017) or an adaption of it such as a Density-based Multiple Surface Aggregation algorithm may be used for the three-dimensional road area segmentation, particularly for a surface aggregation and/or for segmenting the elevated and/or road surface instances. Furthermore, the solution according to the present invention may allow for classifying cells into "road" and "elevated" based on their height (relative to the input surface) and depth error. Apart from this, a lateral road profile based on individually fitting the surfaces obtained by segmenting the Road Area is less sensitive to outliers.

Furthermore, according to an example embodiment of the present invention, the elements may be arranged in an at least or exactly two-dimensional arrangement. This may be achieved by using a two-dimensional map like a depth map to organize the elements. The density levels may then be determined based on the density of the different classes according to the two-dimensional arrangement, particularly by determining the density for a position in the two-dimensional arrangement based on the percentage of elements belonging to the same class in the vicinity of this position. The density level may be computed for both the elevated and the road class, for every element, particularly point, in a region of interest of the two-dimensional arrangement. The region of interest may refer to a region of the scene that includes the road.

It is also possible that the classification is carried out based on an evaluation, particularly comparison, of the heights based on at least or exactly one threshold. The threshold may be dynamically determined based on the heights, particularly based on a standard deviation of the heights. The allows to dynamically adapt the threshold to a current situation.

Also, according to an example embodiment of the present invention, the three-dimensional road area segmentation may comprise carrying out a density-based multiple surface aggregation, the density-based multiple surface aggregation may comprise identifying core cells from the elements having a density level greater than a predefined threshold and border cells from the elements having a density level smaller than the threshold. The surfaces may be formed by evaluating the identified cells, particularly by using a Breath-First search strategy. This has the advantage of a fast and reliable aggregation of the surfaces.

Additionally, according to an example embodiment of the present invention, the three-dimensional road area segmentation may comprise fitting a planar surface to each of the formed surfaces. This allows to determine a lateral road profile that may be based on the height differences between an input surface and the fitted surfaces.

Furthermore, according to an example embodiment of the present invention, before carrying out the three-dimensional road area segmentation, a filtering procedure may be carried out, thereby filtering the elements depending on their flatness and/or depth range and/or height relative to an input planar surface of the input data and position. This further improves the reliability and performance of the algorithm.

Also, according to an example embodiment of the present invention, the input data may comprise a depth map and particularly at least one (particularly planar) surface estimation of at least one surface of the scene, the heights of each of the elements being obtained from the depth map and particularly from the at least one surface estimation. In other words, it is possible that a depth map is provided, particularly with a depth standard deviation and flatness. The depth map may correspond to an input image. Using the depth map as input, a planar surface for each road and for each elevated surface in the scene such as sidewalks, traffic isles, roundabouts and the like may be estimated. Then, based in this estimation, an instance segmentation may be carried out to find the cells in the input image that belong to each surface. Furthermore, based on the estimated 3D planes, a lateral road profile may be built for a given depth.

It is also possible that a control of the vehicle is initiated based on the identified surfaces, the control particularly comprising autonomous driving the vehicle. The method according to the present invention may also be used for drivable area detection and for sidewalk and/or traffic isles detection. Furthermore, it may be used to determine whether a pedestrian is on the sidewalk or on the road area. It may further be integrated in the camera system, particularly of the vehicle and/or it may be configured to run in real time. The vehicle may be a passenger car and/or a motor vehicle and/or an autonomous vehicle. The sensor detection may be carried out using at least one sensor of the vehicle.

In another aspect of the present invention a computer program may be provided, in particular a computer program product, comprising instructions which, when the computer program is executed by a computer, cause the computer to carry out the method according to the present invention. Thus, the computer program according to the present invention can have the same advantages as have been described in detail with reference to a method according to the present invention.

In another aspect of the present invention, an apparatus for data processing may be provided, which is configured to execute the method according to the present invention. As the apparatus, for example, a computer can be provided which executes the computer program according to the present invention. The computer may include at least one processor that can be used to execute the computer program. Also, a non-volatile data memory may be provided in which the computer program may be stored and from which the computer program may be read by the processor for being carried out.

According to another aspect of the present invention, a computer-readable storage medium may be provided which comprises the computer program according to the present invention. The storage medium may be formed as a data storage device such as a hard disk and/or a non-volatile memory and/or a memory card and/or a solid-state drive. The storage medium may, for example, be integrated into the computer.

Furthermore, the method according to the present invention may be implemented as a computer-implemented method.

Further advantages, features and details of the present invention will be apparent from the following description, in which embodiments of the present invention are described in detail with reference to the figures. In this connection, the features disclosed herein may each be essential to the present invention individually or in any combination.

BRIEF DESCRIPTION OF THE DRAWINGS

FIG. 7 schematically shows a lateral road profile shown on a scene with elevated surfaces on either side of the road.

In the following figures, the identical reference signs are used for the same technical features even of different embodiment examples.

DETAILED DESCRIPTION OF EXAMPLE EMBODIMENTS

Figure 1:
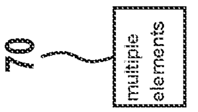
FIG. 1 schematically shows a visualization of a method, a computer program, and an apparatus according to example embodiments of the present invention.
Figure 1:
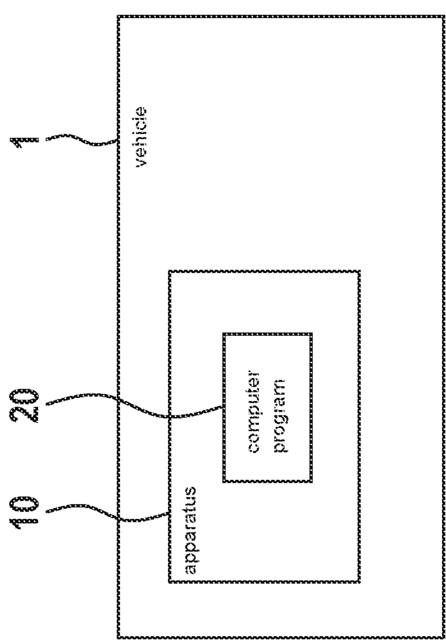
Figure 1:
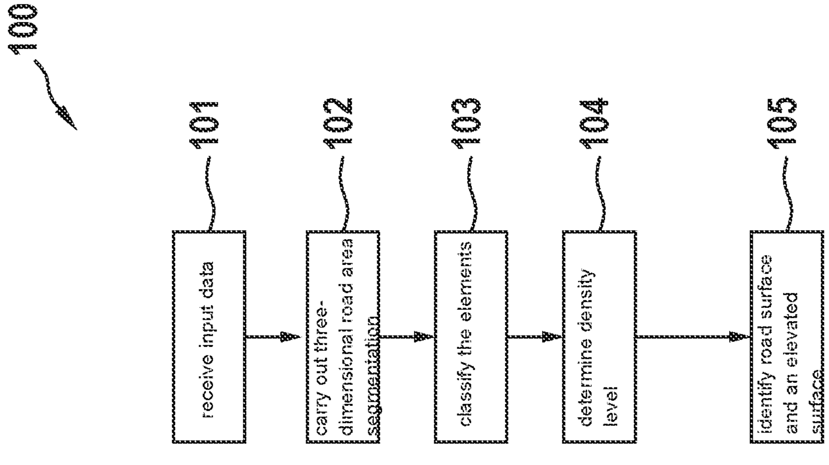

FIG. 1 shows a method 100 and a computer program 20 as well as an apparatus 10 according to embodiments of the present invention. The method 100 can be used for a three-dimensional road area segmentation 230 for a vehicle 1. To this end, the apparatus 10 may be part of the vehicle 1.

According to a first method step 101, input data 210 may be obtained that comprise multiple elements 70, such as cells or pixels, representing a scene 60 of an environment of the vehicle 1. The input data 210 may also indicate heights of the scene 60. According to a second method step 102, the three-dimensional road area segmentation 230 may be carried out based on the input data 210. The segmentation 230 may comprise, according to a third method step 103, classifying the elements 70 based on the heights into at least a road class 226 and an elevated surface class 225. In other words, a classification may be carried out, thereby providing a classification result for each of the elements 70 that indicates if the respective element 70 represents the road or an elevated surface in the scene. The elevated surface may be an surface adjacent to the road which is elevated with respect to the road. Afterwards, according to a fourth method step 104, a density level 233 for multiple of the elements 70 may be determined based on the classification results. To this end, the density levels 233 may be based on the density of the different classes 225, 226 (see FIG. 5). In other words, the more elements 70 in an area belong to the same class, the higher the density level of this class. Then, according to a fifth method step 105, at least a road surface 510 and an elevated surface 520 in the scene 60 may be identified by forming the surfaces 510, 520 based on the density levels 233. The forming of the surfaces may be done using a Breath-First search strategy and/or an algorithm like DBSCAN or an adaption of it.

Figure 2:
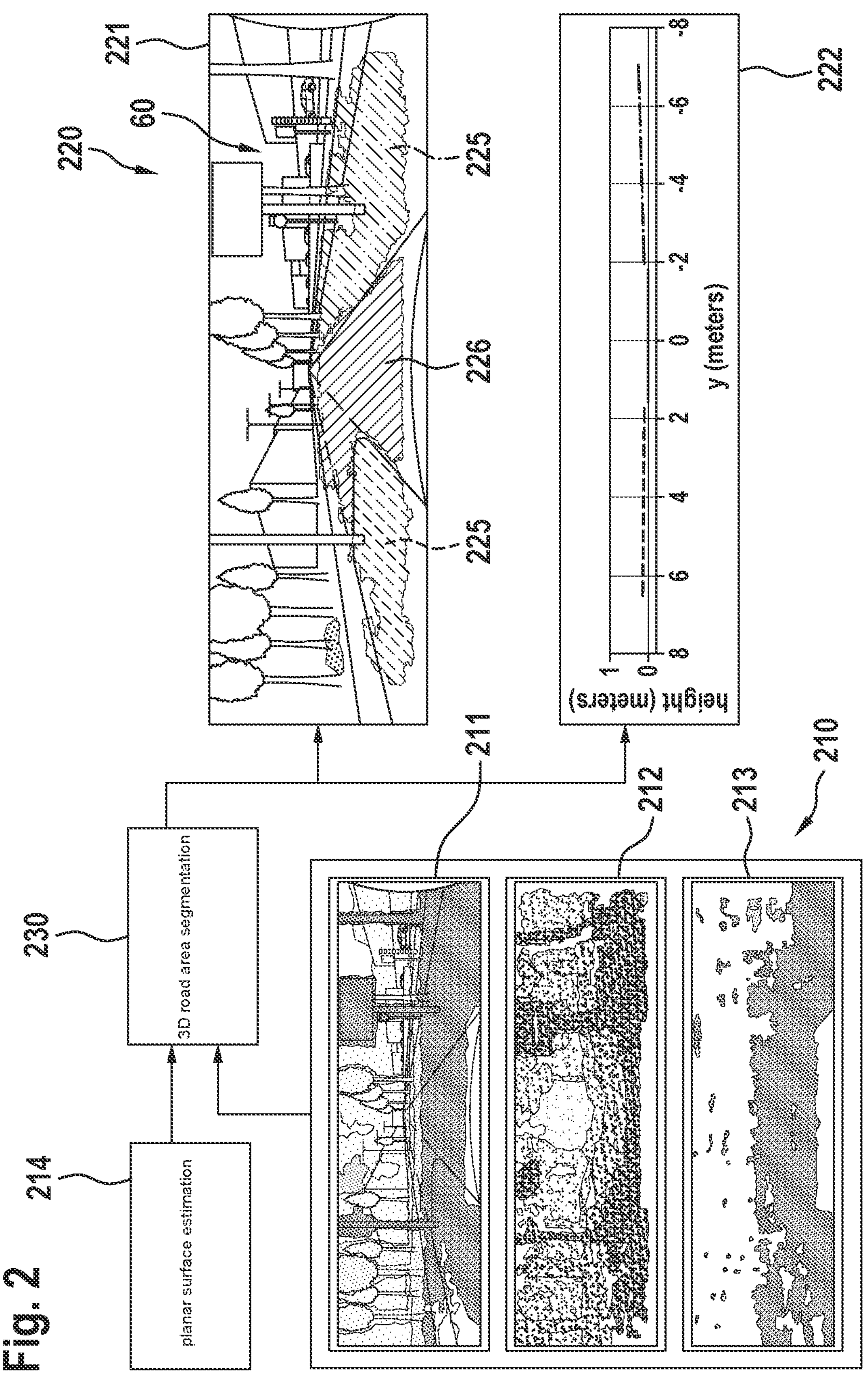
FIG. 2 schematically shows an overview of the inputs and outputs of a method according to example embodiments of the present invention.

FIG. 2 shows an overview of the possible inputs 210 and outputs 220 used for the method according to embodiments of the present invention. The inputs 210 may comprise a depth map 211, a depth standard deviation 212 and particularly a flatness 213. The inputs may be used for a 3D road area segmentation 230 that may also use a planar surface estimation 214 as another input. The outputs 220 may comprise an instance segmentation output 221 and a lateral road profile 222 (particularly, the left and right sidewalks may be segmented independently, see FIG. 7). The segmentation output 221 may further comprise a cell classification into the following classes: "road" 226 and "elevated" 225.

Figure 3:
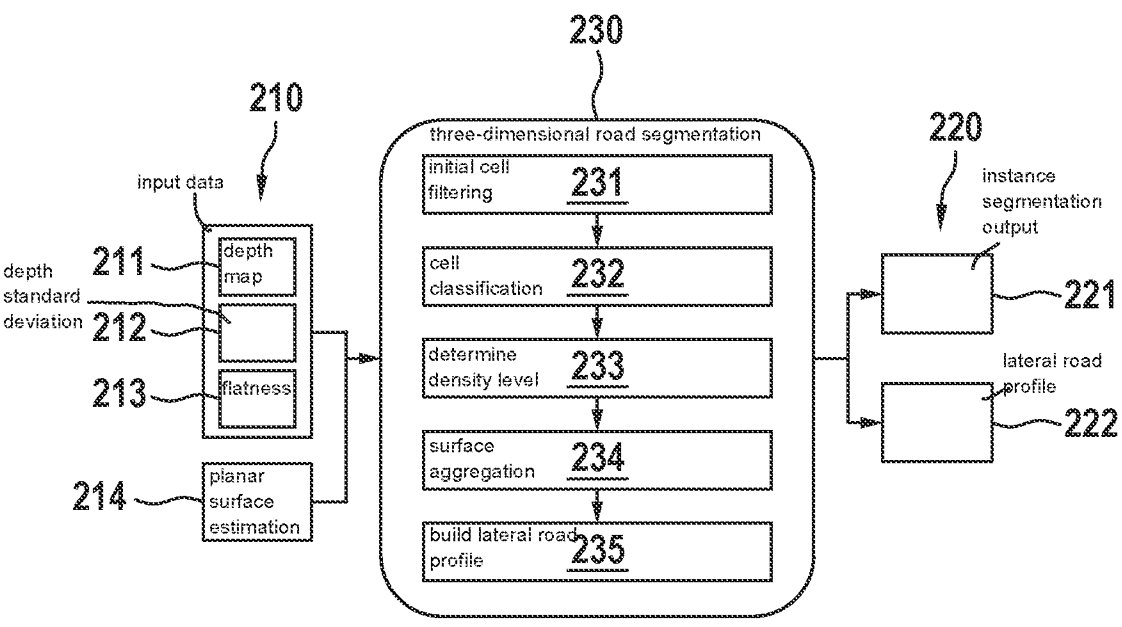
FIG. 3 schematically shows an overview of method steps according to example embodiments of the present invention.

According to FIG. 3, a three-dimensional road area segmentation 230 may be based on an initial cell filtering 231 and cell classification 232 into the mentioned classes (road/elevated). The resulting classification may be used for computing 233 the road and/or elevated density level. Furthermore, the resulting density levels may be used by a surface aggregation algorithm 234 such as the Density-based Multiple Surface Aggregation Algorithm (an adaptation of DBSCAN) to segment the elevated and/or road surface instances. The 3D planes fitted to these Surfaces may then be used for building 235 a lateral road profile.

According to a cell filtering step 231, cells may be filtered based on their flatness, depth range, height relative to the input planar surface, and position in the image. Only cells in a predefined region of interest (RoI) may be processed. The RoI may be configured as a rectangle under the focus of expansion (FoE).

Figure 4:
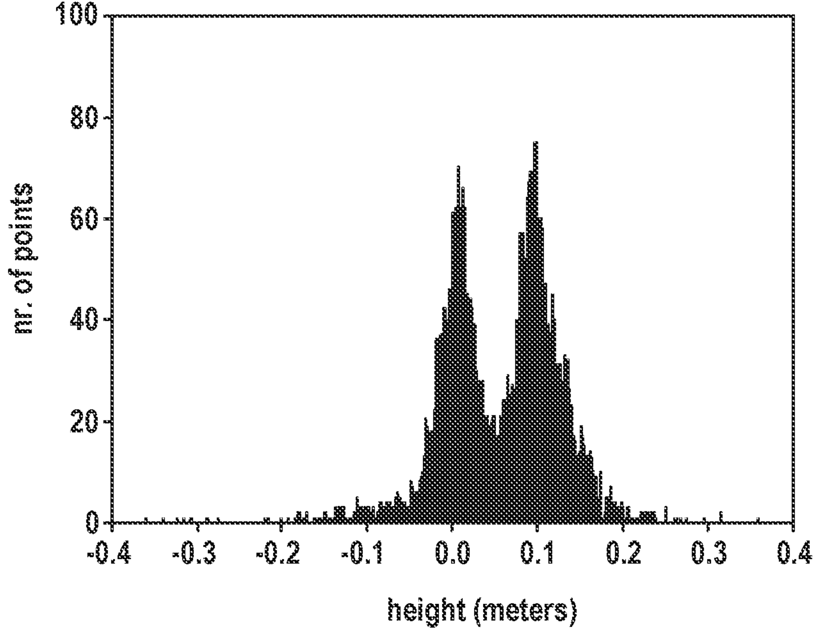
FIG. 4 schematically shows an exemplarily histogram of heights relative to the road surface for a scene with sidewalks on both sides of the road.

According to a dynamic threshold cell classification step 232, the cells in the RoI may be classified into road and elevated, as depicted in FIG. 4. In this example, an input from a scene with sidewalks on both sides of the road has been used to generate the histogram of the heights. This classification can be based on the height of the points relative to the road surface and the depth standard deviation.

In FIG. 4, there are two prominent distributions, one for the road and another for elevated surfaces. The naive approach is to split these distributions based on static thresholds. This approach is in some cases unsuitable as the height error increases with depth. A point with a height of 5 cm at a depth of 7 meters most likely belongs to the "elevated" class, while at a depth of 30 meters, it is most probably an outlier of the road surface. The road distribution is always centred at zero because height is computed based on the road surface. Therefore, by calculating the z score relative to the road distribution for all the cells in the RoI, an indicator of the likelihood of belonging to the road class can be obtained. The z-score may be computed by dividing the observed height by the height standard deviation:

$$z_A = \frac{h_a - \mu_{h_A}}{\sigma_{h_A}}$$

where $\mu_{h_A}=0$ (mean height for a point on the road is 0).

The height standard deviation for a cell A is approximated as: $\sigma_{h_A}=|v_A|\cdot\sigma_{x_A}$ where v is the vertical coordinate in the normalized coordinate system.

Figure 5:
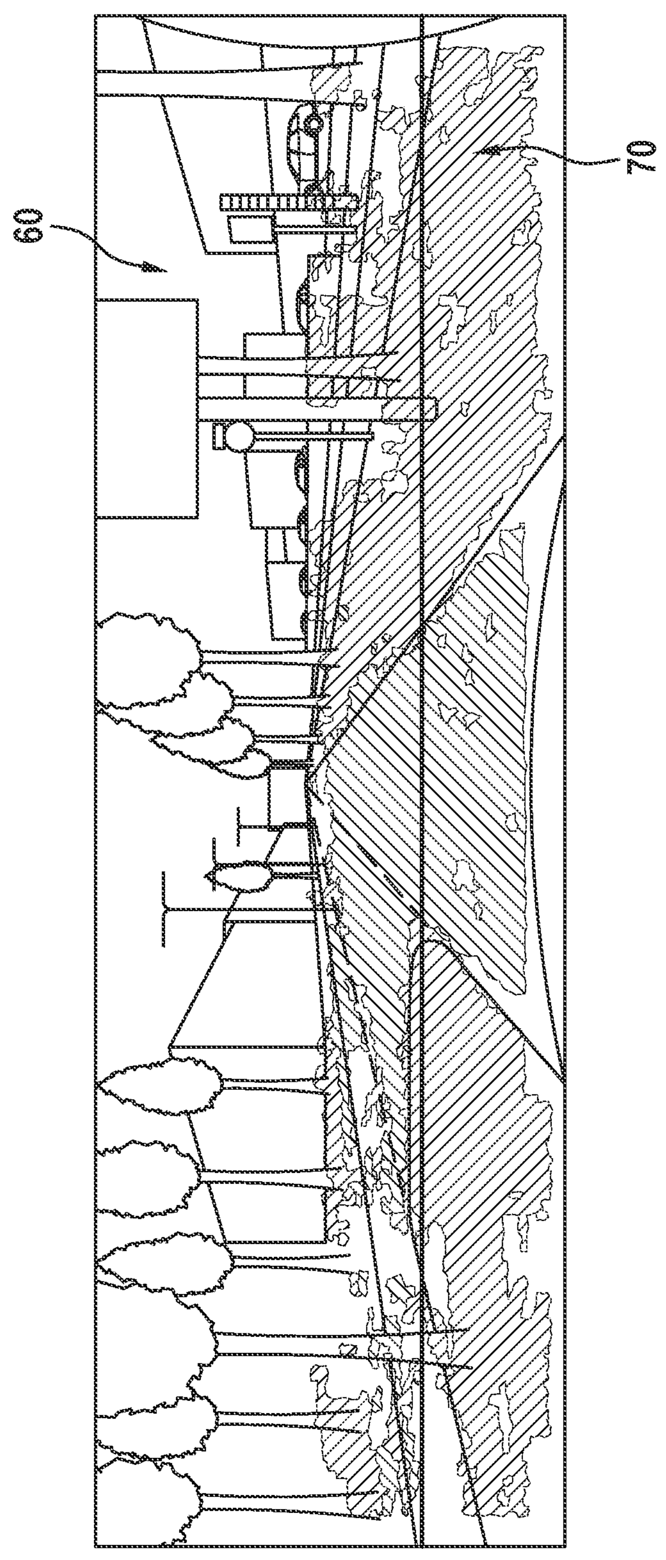
FIG. 5 schematically shows an exemplarily classification output.

Cells with z-scores above a given threshold (usually between two and three standard deviations) may be classified as elevated and cells with z-scores under a given threshold may be below the road surface. Therefore, for each class, a range of z scores may be used for classification. In FIG. 5, a classification output is exemplarily shown.

The density level at a given (e.g., row, col) location in the image may be the percentage of cells in the vicinity that belong to a specific class. The density level may be computed for both the elevated and the road class. A density level estimate may be required for every point in the RoI. The computation may involve parsing a kernel of fixed size over the cells in the RoI and computing the percentage of points having the target class. This phase can be optimized by computing the partial sums.

Figure 6:
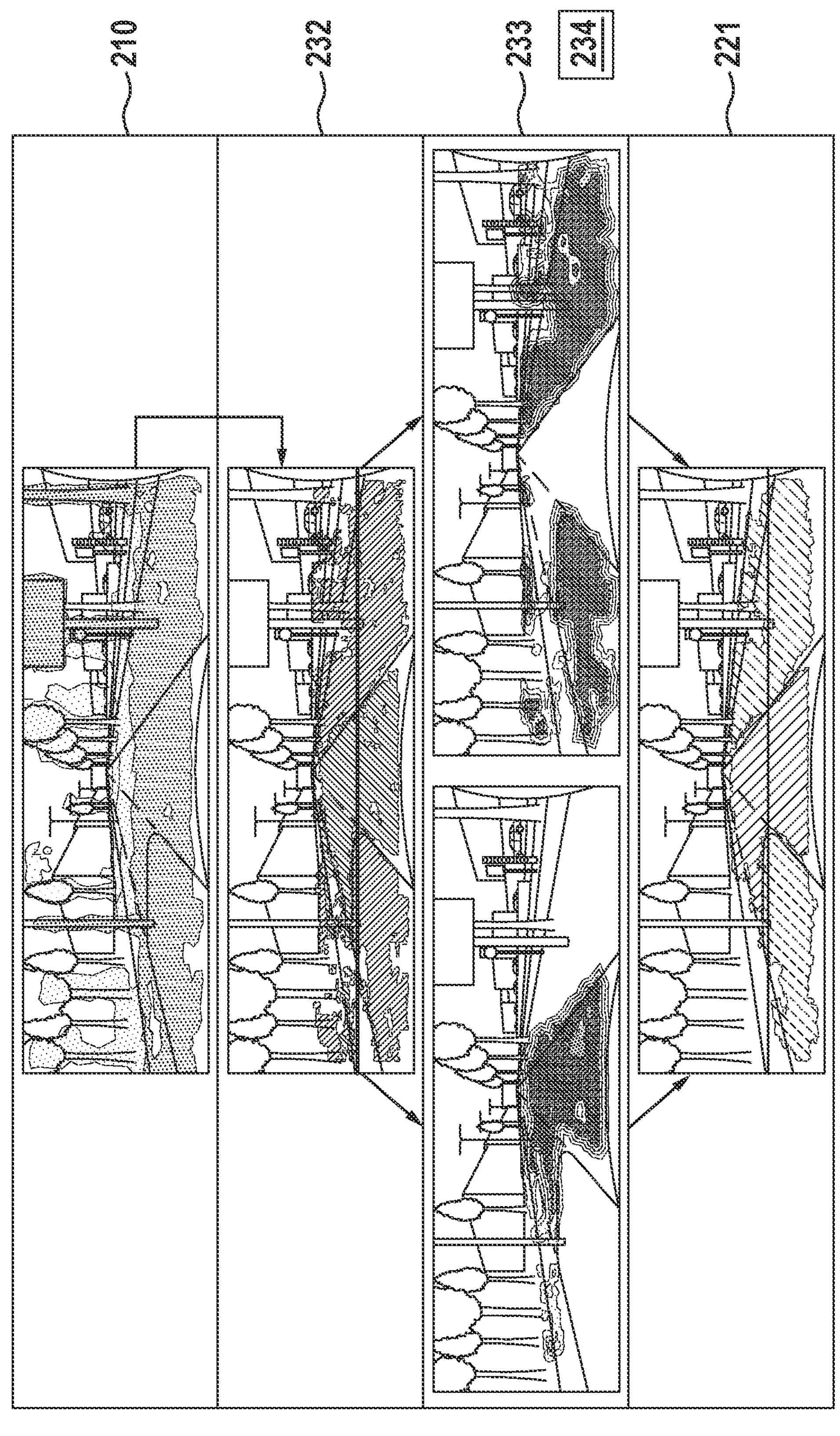
FIG. 6 schematically shows a visualization of a usage of road and elevated density levels in the road area segmentation component.

In FIG. 6, an exemplary usage of road and elevated density level in the road area segmentation component is shown. The output 221 may be obtained by a surface aggregation algorithm 234. The surface aggregation algorithm 234 may be an adaptation of DBSCAN. In this case, it is a density-based region-growing algorithm based on two different types of cells: core cells and border cells. A core cell is a cell that has a density level greater than a fixed threshold. If the density level is greater than this threshold, the cell's initial classification or depth availability may be not interesting since it can safely be assumed that a cell surrounded by enough cells of a given class belongs to that class. A border cell is a cell that has a density level smaller than the core density level threshold but higher than the border density level threshold. Since border cells are usually in ambiguous contexts (e.g., curbs), the cell's class (assigned in the classification phase) must preferably match the class of the forming surface. There are core and border cells for elevated and road classes alike. Surfaces start from a single core cell and expand in a region-growing fashion with the neighbouring core cells using the Breath-First search strategy. Core cells may be added in a queue. At each step, the next cell from the queue may be taken and all their neighbours may be checked. (a cell may be a neighbour if it is in a 5×5 kernel). If there are core or border cells in the vicinity, they may be assigned to the forming surface, but only core cells may be added back into the queue (as in DBSCAN, only core cells can expand the surface further). After the region-growing phase, some surfaces that do not meet the minimum quality criteria may be filtered out. These criteria might include the number of core cells, position in the image, etc.

Figure 7:
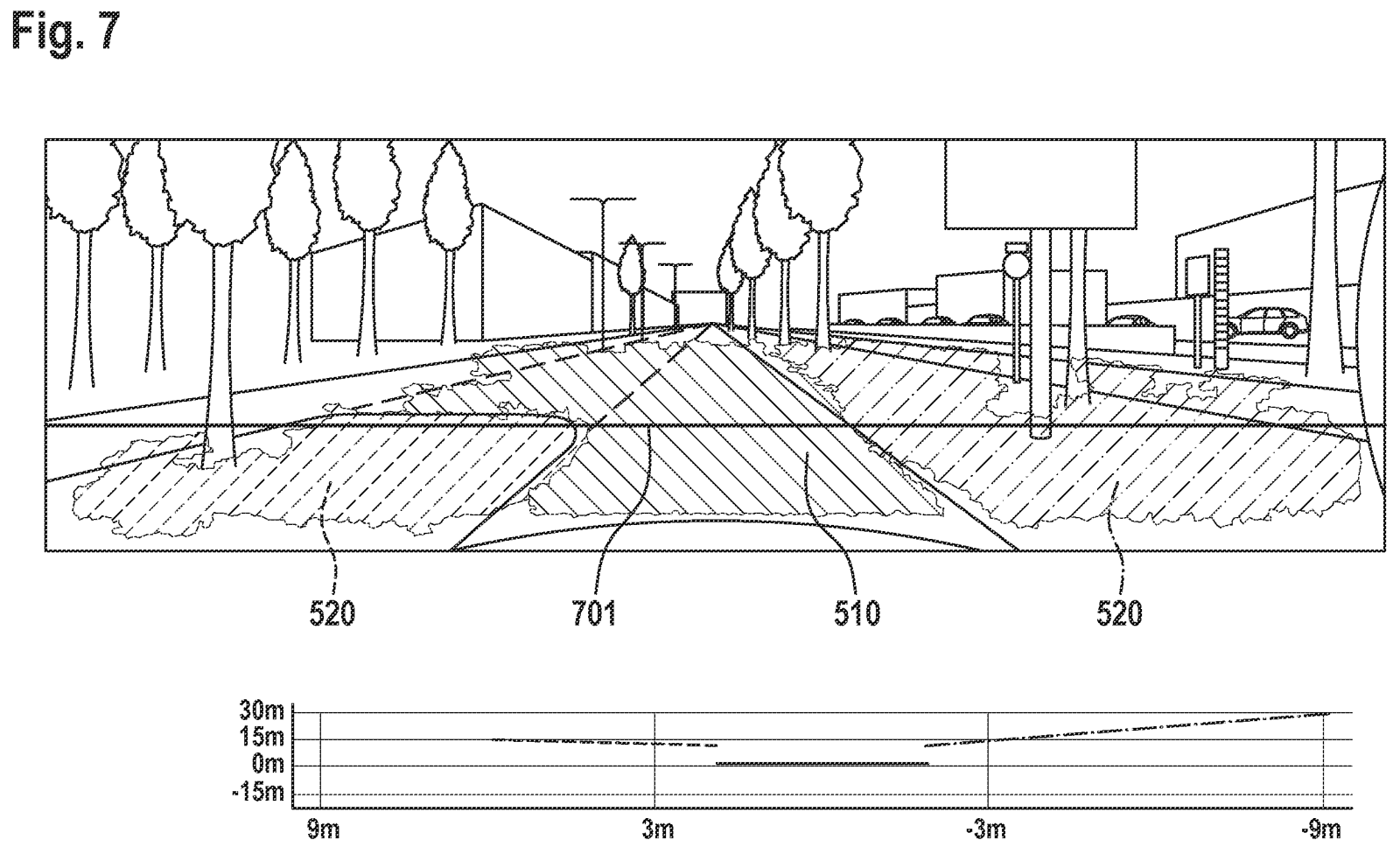

A planar surface may be fitted to each of the aggregated surfaces. The lateral road profile 222 may be based on the height differences between the input surface and the afore mentioned fitted surfaces. The height difference between two planar surfaces can be easily computed for a given position (row, col). Firstly, the row for which to compute the lateral road profile may be identified. This can be done by solving the input surface equation (depth=a·u+b·v+c) for the desired depth. The solution is a line that can be projected to the image coordinate system (row=a·col+b). This equation may be solved for the middle column to obtain the desired row and this row may be denoted by $Irp_{row}$. Once the $Irp_{row}$ has been identified, the ranges of columns on that row that belong to the same surface can be identified. To this end, the surface id of each cell on the $Irp_{row}$ can be checked and ranges of columns can be built out of consecutive surface ids. However, that would make the algorithm sensitive to outliers. Therefore, instead of the actual surface id, the winner surface id may be used. A cell's winner surface may be different than the surface assigned by the surface aggregation algorithm. The winner surface may refer to the surface that contains the most cells in a 5×5 kernel around the cell and its class density level is above a predefined threshold. A cell can have no winner surface. In FIG. 7, the lateral road profile is shown in the upper right on a scene with elevated surfaces on either side of the road. Furthermore, the $Irp_{row}$ is marked by the line 701.

After the ranges of columns on the $Irp_{row}$ are computed based on the winner surface ids, their edge points may be converted to 3D. The lateral coordinate may be computed based on the camera intrinsic parameters and the height may be the difference between the winner surface and the input surface at the edges of the lateral road profile segments.

The foregoing explanation of the embodiments describes the present invention in the context of examples. Of course, individual features of the embodiments can be freely combined with each other, provided that this is technically reasonable, without leaving the scope of the present invention.

What is claimed is:

1. A method for a three-dimensional road area segmentation for a vehicle, comprising the following steps:

obtaining input data, the input data including multiple elements representing a scene of an environment of the vehicle, the input data indicating heights of the scene, the input data resulting at least partially from a sensor detection of the environment; and carrying out the three-dimensional road area segmentation based on the input data, the three-dimensional road area segmentation including:

classifying the elements based on the heights into different classes including at least a road class and an elevated surface class to provide a classification result for each of the elements, determining a density level for multiple of the elements based on the classification results, the density levels being based on a density of the different classes, and identifying at least a road surface and an elevated surface in the scene by forming the surfaces based on the density levels, wherein the three-dimensional road area segmentation includes carrying out a density-based multiple surface aggregation, the density-based multiple surface aggregation including identifying core cells from the elements having a density level greater than a predefined threshold and border cells from the elements having a density level smaller than the threshold, the surfaces being formed by evaluating the identified cells using a Breadth-First search strategy.

2. The method of claim 1, wherein the elements are arranged in an at least two-dimensional arrangement, the density levels being determined based on the density of the different classes according to the two-dimensional arrangement by determining a density for a position in the two-dimensional arrangement based on a percentage of elements belonging to the same class in a vicinity of the position.

3. The method of claim 1, wherein the classification is carried out based on an evaluation including a comparison of the heights based on at least one threshold, the threshold being dynamically determined based on a standard deviation of the heights.

4. The method of claim 1, wherein the three-dimensional road area segmentation includes fitting a planar surface to each of the formed surfaces to determine a lateral road profile.

5. The method of claim 1, wherein, before carrying out the three-dimensional road area segmentation, a filtering procedure is carried out to filter the elements depending on their flatness and/or depth range and/or height relative to an input planar surface of the input data and position.

6. The method of claim 1, wherein the input data includes a depth map and at least one surface estimation of at least one surface of the scene, heights of each of the elements being obtained from the depth map including from the at least one surface estimation.

7. The method of claim 1, wherein a control of the vehicle is initiated based on the identified surfaces, the control including autonomously driving the vehicle.

8. A non-transitory computer-readable medium on which is stored a computer program including instructions for a three-dimensional road area segmentation for a vehicle, the instructions, when executed by a computer, causing the computer to perform the following steps:

obtaining input data, the input data including multiple elements representing a scene of an environment of the vehicle, the input data indicating heights of the scene, the input data resulting at least partially from a sensor detection of the environment; and carrying out the three-dimensional road area segmentation based on the input data, the three-dimensional road area segmentation including:

classifying the elements based on the heights into different classes including at least a road class and an elevated surface class to provide a classification result for each of the elements, determining a density level for multiple of the elements based on the classification results, the density levels being based on a density of the different classes, and identifying at least a road surface and an elevated surface in the scene by forming the surfaces based on the density levels, wherein the three-dimensional road area segmentation includes carrying out a density-based multiple surface aggregation, the density-based multiple surface aggregation including identifying core cells from the elements having a density level greater than a predefined threshold and border cells from the elements having a density level smaller than the threshold, the surfaces being formed by evaluating the identified cells using a Breadth-First search strategy.

9. A data processing apparatus configured for a three-dimensional road area segmentation for a vehicle, the data processing apparatus configured to:

obtain input data, the input data including multiple elements representing a scene of an environment of the vehicle, the input data indicating heights of the scene, the input data resulting at least partially from a sensor detection of the environment; and carry out the three-dimensional road area segmentation based on the input data, the three-dimensional road area segmentation including:

classifying the elements based on the heights into different classes including at least a road class and an elevated surface class to provide a classification result for each of the elements, determining a density level for multiple of the elements based on the classification results, the density levels being based on a density of the different classes, and identifying at least a road surface and an elevated surface in the scene by forming the surfaces based on the density levels, wherein the three-dimensional road area segmentation includes carrying out a density-based multiple surface aggregation, the density-based multiple surface aggregation including identifying core cells from the elements having a density level greater than a predefined threshold and border cells from the elements having a density level smaller than the threshold, the surfaces being formed by evaluating the identified cells using a Breadth-First search strategy.

* * * * *